US010698642B2

(12) United States Patent
Nishikai et al.

(10) Patent No.: US 10,698,642 B2
(45) Date of Patent: Jun. 30, 2020

(54) REMOTE MANAGEMENT SYSTEM AND INFORMATION PROCESSING METHOD

(71) Applicant: KYOCERA DOCUMENT SOLUTIONS INC., Osaka (JP)

(72) Inventors: Kazuki Nishikai, Osaka (JP); Takeshi Nakamura, Osaka (JP); Satoshi Goshima, Osaka (JP); Dukil Park, Osaka (JP); Yuichi Obayashi, Osaka (JP); Takumi Nakamura, Osaka (JP); Koki Nakajima, Osaka (JP); Yasuo Nakashima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/445,502

(22) Filed: Jun. 19, 2019

(65) Prior Publication Data

US 2019/0391769 A1    Dec. 26, 2019

(30) Foreign Application Priority Data

Jun. 22, 2018  (JP) .................................. 2018-118877
Jun. 22, 2018  (JP) .................................. 2018-118879

(51) Int. Cl.
*G06F 3/12* (2006.01)
*H04L 29/08* (2006.01)

(52) U.S. Cl.
CPC ............ *G06F 3/1236* (2013.01); *G06F 3/122* (2013.01); *G06F 3/1204* (2013.01); *G06F 3/1226* (2013.01); *G06F 3/1239* (2013.01); *G06F 3/1288* (2013.01); *H04L 67/1008* (2013.01); *H04L 67/2842* (2013.01)

(58) Field of Classification Search
None
See application file for complete search history.

(56) References Cited

U.S. PATENT DOCUMENTS

2004/0153549 A1\* 8/2004 Naito ...................... H04L 29/06
                                                          709/228
2004/0243712 A1\* 12/2004 Sakai ...................... H04L 41/00
                                                          709/227

(Continued)

FOREIGN PATENT DOCUMENTS

JP    2017-208752 A    11/2017
JP    2018-011247 A     1/2018

*Primary Examiner* — Ted W Barnes
(74) *Attorney, Agent, or Firm* — Li & Cai Intellectual Property (USA) Office

(57) ABSTRACT

A remote maintenance server includes a processor that operates as a remote panel function start instruction receiving unit that receives an instruction to start a remote panel function from a user via the user terminal and the user operation server, a relay server determining unit that determines the relay server to be used when executing the remote panel function, a verification information writing unit that writes verification information in the cache server, the verification information being used when the relay server relays connection, and a connection command sending unit that sends a connection command to the image forming apparatus that executes the remote panel function via the connection server, the connection command instructing to connect to the relay server to be used.

7 Claims, 12 Drawing Sheets

(56) References Cited

U.S. PATENT DOCUMENTS

| | | | |
|---|---|---|---|
| 2015/0124290 A1* | 5/2015 | Tajima | G06F 3/1205 |
| | | | 358/1.15 |
| 2017/0264760 A1* | 9/2017 | Sato | G06F 3/1229 |
| 2017/0310832 A1* | 10/2017 | Fukushima | G06F 11/0766 |
| 2018/0067707 A1* | 3/2018 | Fukushima | G06F 3/121 |
| 2018/0332182 A1* | 11/2018 | Fukasawa | H04N 1/32771 |
| 2019/0004758 A1* | 1/2019 | Nakajima | G06F 3/1207 |
| 2019/0073166 A1* | 3/2019 | Fukushima | G06F 3/121 |

\* cited by examiner

REMOTE MANAGEMENT SYSTEM AND INFORMATION PROCESSING METHOD

CROSS REFERENCE TO RELATED APPLICATION

This application claims the benefit of Japanese Priority Patent Applications JP 2018-118877 and JP 2018-118879 filed Jun. 22, 2018, the entire contents of which are incorporated herein by reference.

BACKGROUND OF THE INVENTION

1. Field of the Invention

The present disclosure relates to a remote management system and an information processing method for managing image forming apparatuses (MFP, Multifunction Peripherals) via a network.

2. Description of Related Art

There is known a remote panel function. According to the remote panel function, in a remote management system for managing an image forming apparatus via a network, an operation unit of the image forming apparatus is displayed on a browser or the like via a network.

It is desirable to provide a remote management system and an information processing method capable of transferring video data in the remote panel function stably and at a high speed without depending on a network speed of a public network or a geographic status of the network.

SUMMARY OF THE INVENTION

According to an embodiment of the present disclosure, there is provided a remote management system, including:
  a user operation server;
  a remote maintenance server;
  a connection server;
  a relay server;
  a cache server;
  a user terminal; and
  an image forming apparatus,
  the user operation server, the remote maintenance server, the connection server, the relay server, and the cache server being connected to each other via a network,
  the user terminal being connected to the user operation server, the remote maintenance server, the connection server, the relay server, and the cache server via Internet,
  the image forming apparatus being connected to the user operation server, the remote maintenance server, the connection server, the relay server, and the cache server via the Internet,
  the remote maintenance server including a processor that operates as
    a remote panel function start instruction receiving unit that receives an instruction to start a remote panel function from a user via the user terminal and the user operation server,
    a relay server determining unit that determines the relay server to be used when executing the remote panel function,
    a verification information writing unit that writes verification information in the cache server, the verification information being used when the relay server relays connection, and
    a connection command sending unit that sends a connection command to the image forming apparatus that executes the remote panel function via the connection server, the connection command instructing to connect to the relay server to be used,
  the relay server including a processor that
    relays connection from the user terminal that executes the remote panel function and connection from the image forming apparatus that executes the remote panel function on a basis of verification information stored in the cache server.

According to an embodiment of the present disclosure, there is provided an information processing method for an remote management system including
  a user operation server,
  a remote maintenance server,
  a connection server,
  a relay server,
  a cache server,
  a user terminal, and
  an image forming apparatus,
  the user operation server, the remote maintenance server, the connection server, the relay server, and the cache server being connected to each other via a network,
  the user terminal being connected to the user operation server, the remote maintenance server, the connection server, the relay server, and the cache server via Internet,
  the image forming apparatus being connected to the user operation server, the remote maintenance server, the connection server, the relay server, and the cache server via the Internet,
  the information processing method including:
    by a remote panel function start instruction receiving unit of the remote maintenance server, receiving an instruction to start a remote panel function from a user via the user terminal and the user operation server;
    by a relay server determining unit of the remote maintenance server, determining the relay server to be used when executing the remote panel function to connect the user terminal and the image forming apparatus;
    by a verification information writing unit of the remote maintenance server, writing verification information in the cache server, the verification information being used when the relay server relays connection between the user terminal and the image forming apparatus by using the remote panel function;
    by a connection command sending unit of the remote maintenance server, sending a connection command to the image forming apparatus that executes the remote panel function via the connection server, the connection command instructing to connect to the relay server determined;
    by the image forming apparatus that executes the remote panel function, connecting to the relay server determined;
    by the user terminal that executes the remote panel function, connecting to the relay server determined; and
    by the relay server, connecting the image forming apparatus and the user terminal that executes the remote panel function by using the verification information in the cache server, and starting the remote panel function.

According to an embodiment of the present disclosure, there is provided an information processing method, method for an remote management system including
  a relay management server, relay servers,
a user terminal, and
an image forming apparatus,
the relay management server, the relay servers, the user terminal, and the image forming apparatus being connected to each other via a network,
the information processing method including:
by a first connect receiving unit of the relay management server, receiving connection from the user terminal and the image forming apparatus to execute a remote panel function;
by a live confirmation unit of the relay management server, sending a "live confirmation" message to the relay servers, and checking whether or not the relay servers are capable of newly receiving transfer of connection;
by a connection volume confirmation unit of each of the relay servers, confirming whether or not a connection volume of the relay server reaches an upper limit,
by a live confirmation reply unit of each of the relay servers, sending, in reply to the "live confirmation" message sent from the relay management server, a "new request receivable" message or a "new request unreceivable" message on a basis of a confirmation result of the connection volume confirmation unit;
by the connection transferring unit of the relay management server, transferring the connection received by the first connect receiving unit to one relay server that returns the "new request receivable" message; and
by a second connect receiving unit of each of the relay servers, receiving the connection from the user terminal and the image forming apparatus, the connection being transferred from the relay management server.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, embodiments of the present disclosure will be described with reference to the drawings.

First Embodiment

Figure 1:
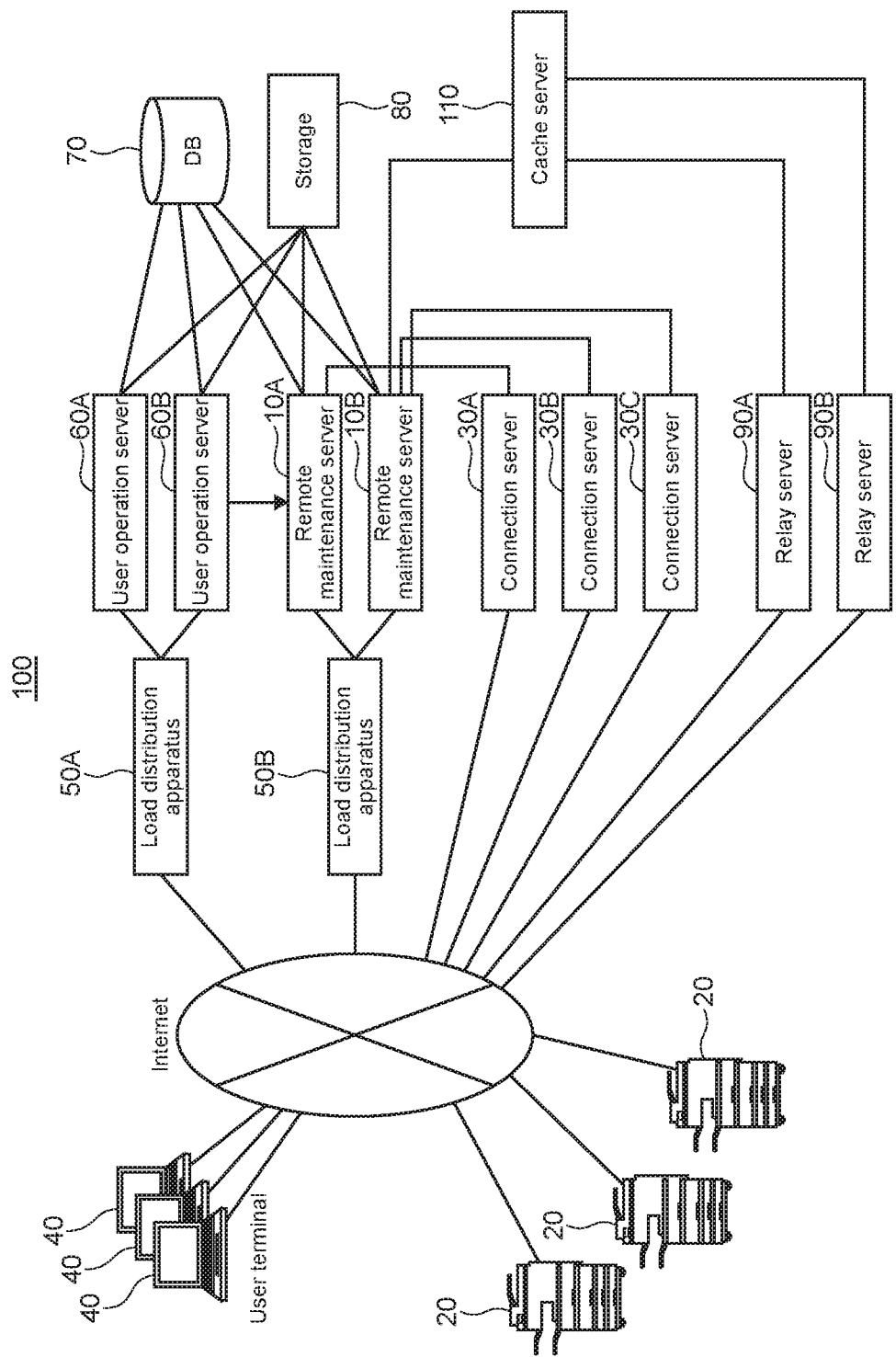
FIG. 1 shows an entire configuration of the remote management system 100 according to a first embodiment of the present disclosure.

[Entire Configuration]
Firstly, an entire configuration of the remote management system 100 according to a first embodiment of the present disclosure will be described. FIG. 1 shows an entire configuration of the remote management system 100 according to a first embodiment of the present disclosure.

The remote management system 100 includes the load distribution apparatuses 50 (hereinafter, the load distribution apparatuses 50A and 50B are collectively referred to as the load distribution apparatuses(es) 50), the user operation servers 60, the remote maintenance servers 10, the DB (database) 70, the storage 80, and the connection server 30, the relay servers 90, the cache server 110, the user terminal 40, and the image forming apparatuses 20, which are connected to each other via a network.

End points from the Internet includes the load distribution apparatus 50A, the load distribution apparatus 50B, the connection server 30A, the connection server 30B, and the connection server 30C, the relay server 90A, and the relay server 90B. The load distribution apparatus 50A distributes accesses from the user terminals 40 to the user operation servers 60A and 60B. The load distribution apparatus 50B distributes accesses from the image forming apparatuses 20 to the remote maintenance servers 10A and 10B.

The load distribution apparatus 50A distributes accesses from the user terminals 40 to the user operation servers 60A and 60B.

The user operation server 60 receives an instruction from a user input from the user terminal 40.

The load distribution apparatus 50B distributes accesses from the image forming apparatuses 20 to the remote maintenance servers 10A and 10B.

The remote maintenance server 10 remotely maintains the image forming apparatuses 20 that the remote maintenance server 10 manages. For example, the remote maintenance server 10 collects daily work information (toner consumption, number of print, etc.), stores the daily work information in the DB 70 and the storage 80, updates firmware of the image forming apparatuses 20.

The DB 70 stores daily work information. The storage 80 stores the daily work information for a long time.

The connection server 30 is a server that executes management connection to the image forming apparatuses 20 in order to send management commands to the image forming apparatuses 20 managed in the remote management system 100. The management connection is continued until the image forming apparatus 20 is powered off.

The image forming apparatus 20 connected to the network firstly connects to the remote maintenance server 10 via the load distribution apparatus 50B, and obtains a response. The response specifies the connection server 30 to which management connection is to be established. After that, the image forming apparatus 20 shuts down the connection to the remote maintenance server 10, connects to the specified connection server 30, and establishes the management connection.

A user accesses the user operation server 60 via the user terminal 40, and instructs to change a setting value of a certain image forming apparatus 20. Then, the remote maintenance server 10 detects the instruction to change setting, and informs a person-in-charge that the setting value is to be changed. Then, the remote maintenance server 10 sends a setting value change command to the image forming apparatus 20 via the connection server 30, and causes the image forming apparatus 20 to change the setting value.

The relay server 90 is a server that relays communication of video data and the like between the user terminal 40 and the image forming apparatus 20 when executing a remote panel function.

The cache server 110 is a server that temporarily stores verification information used to connect the user terminal 40 and the image forming apparatus 20 by the relay server 90.

When a user instructs to start the remote panel function to the remote maintenance server 10 via the user terminal 40, the load distribution apparatus 50A, and the user operation server 60, the remote maintenance server 10 writes verification information in the cache server 110, and instructs the image forming apparatus 20 to connect to the relay server 90 to be used via the connection server 30.

The user terminal 40 and the image forming apparatus 20 connect to the specified relay server 90, and the relay server 90 relays connection on a basis of the verification information. As a result, the remote panel function is executed.

An entire configuration of the remote management system 100 has been described above. Note that, for example, FIG. 1 shows the three connection servers 30. This is merely an example. Actually, the number of the connection servers 30 is not limited.

[Configuration of Remote Maintenance Server]

Figure 2:
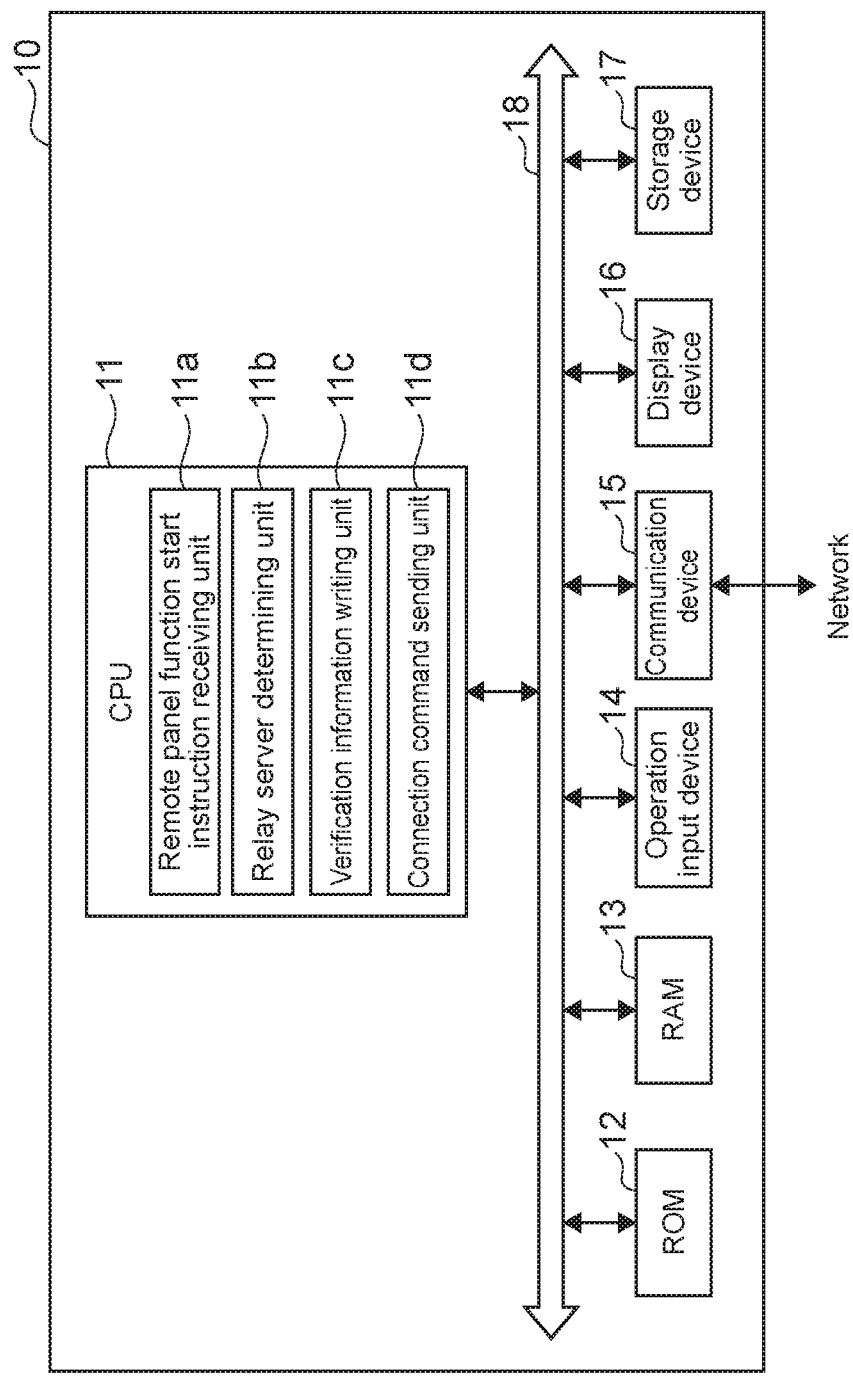
FIG. 2 shows a block configuration of the remote maintenance server 10, where the remote maintenance server 10 is a general-purpose computer.

Next, a configuration of the remote maintenance server 10 will be described. The remote maintenance server 10 may include dedicated hardware or software or a general-purpose computer. FIG. 2 shows a block configuration of the remote maintenance server 10, where the remote maintenance server 10 is a general-purpose computer.

As shown in FIG. 2, the remote maintenance server 10 includes a CPU (Central Processing Unit) 11, a ROM (Read Only Memory) 12, a RAM (Random Access Memory) 13, an operation input device 14, a communication device 15, a display device 16, a storage device 17, and these blocks are connected to each other via a bus 18.

The ROM 12 stores a plurality of programs such as firmware for executing various types of process, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, and various types of data.

The communication device 15 is connected to a network for sending/receiving information to/from apparatuses.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 of the management server 10 executes a program, the CPU 11 operates as the functional blocks described below.

The functional blocks that the CPU 11 of the remote maintenance server 10 realizes are the remote panel function start instruction receiving unit 11a, the relay server determining unit 11b, the verification information writing unit 11c, and the connection command sending unit 11d.

The remote panel function start instruction receiving unit 11a receives an instruction to start a remote panel function from a user via the user terminal 40 and the user operation server 60.

The relay server determining unit 11b determines the relay server 90 to be used when executing the remote panel function.

The verification information writing unit 11c writes verification information in the cache server 110, the verification information being used when the relay server 90 relays connection.

The connection command sending unit 11d sends a connection command to the image forming apparatus 20 that executes the remote panel function via the connection server 30, the connection command instructing to connect to the relay server 90 to be used.

A configuration of the remote maintenance server 10 has been described above.

[Processing Flow]

Figure 3:
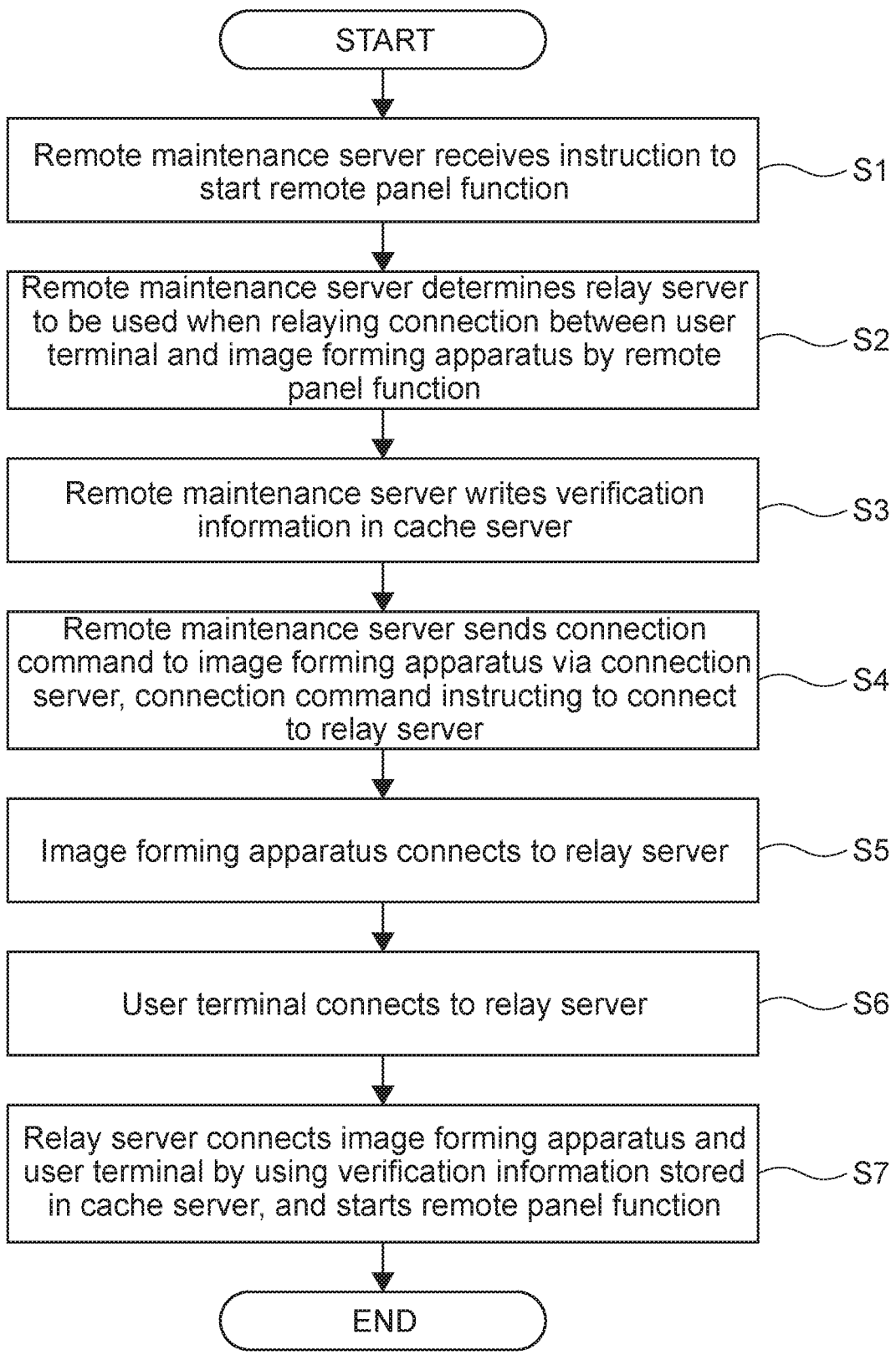
FIG. 3 shows a processing flow of starting the remote panel function by the remote management system 100.

Next, a processing flow of starting the remote panel function by the remote management system 100 will be described. FIG. 3 shows a processing flow of starting the remote panel function by the remote management system 100.

Firstly, the remote panel function start instruction receiving unit 11a of the remote maintenance server receives an instruction to start a remote panel function from a user via the user terminal 40 and the user operation server 60 (Step S1).

Next, the relay server determining unit 11b of the remote maintenance server 10 determines the relay server 90 to be used when relaying connection between the user terminal 40 and the image forming apparatus 20 by the remote panel function (Step S2).

Next, the verification information writing unit 11c of the remote maintenance server 10 writes verification information in the cache server 110, the verification information being used when the relay server 90 relays connection between the user terminal 40 and the image forming apparatus 20 by the remote panel function (Step S3).

Next, the connection command sending unit 11d of the remote maintenance server 10 sends a connection command to the image forming apparatus 20 that executes the remote panel function via the connection server 30, the connection command instructing to connect to the relay server 90 determined (Step S4).

Next, the image forming apparatus 20 that executes the remote panel function connects to the specified relay server 90 (Step S5). The image forming apparatus 20 may connect to the relay server 90 via connection from the remote maintenance server 10 to a specified URI (Uniform Resource Identifier).

Next, the user terminal 40 that executes the remote panel function connects to the specified relay server 90 (Step S6). The user terminal 40 may connect to the relay server 90 via redirection.

Next, the relay server 90 connects the image forming apparatus 20 and the user terminal 40 that execute the remote panel function on a basis of the verification information stored in the cache server 110, and starts the remote panel function (Step S7).

A processing flow of starting the remote panel function by the remote management system 100 has been described above.

Modification Example

Figure 4:
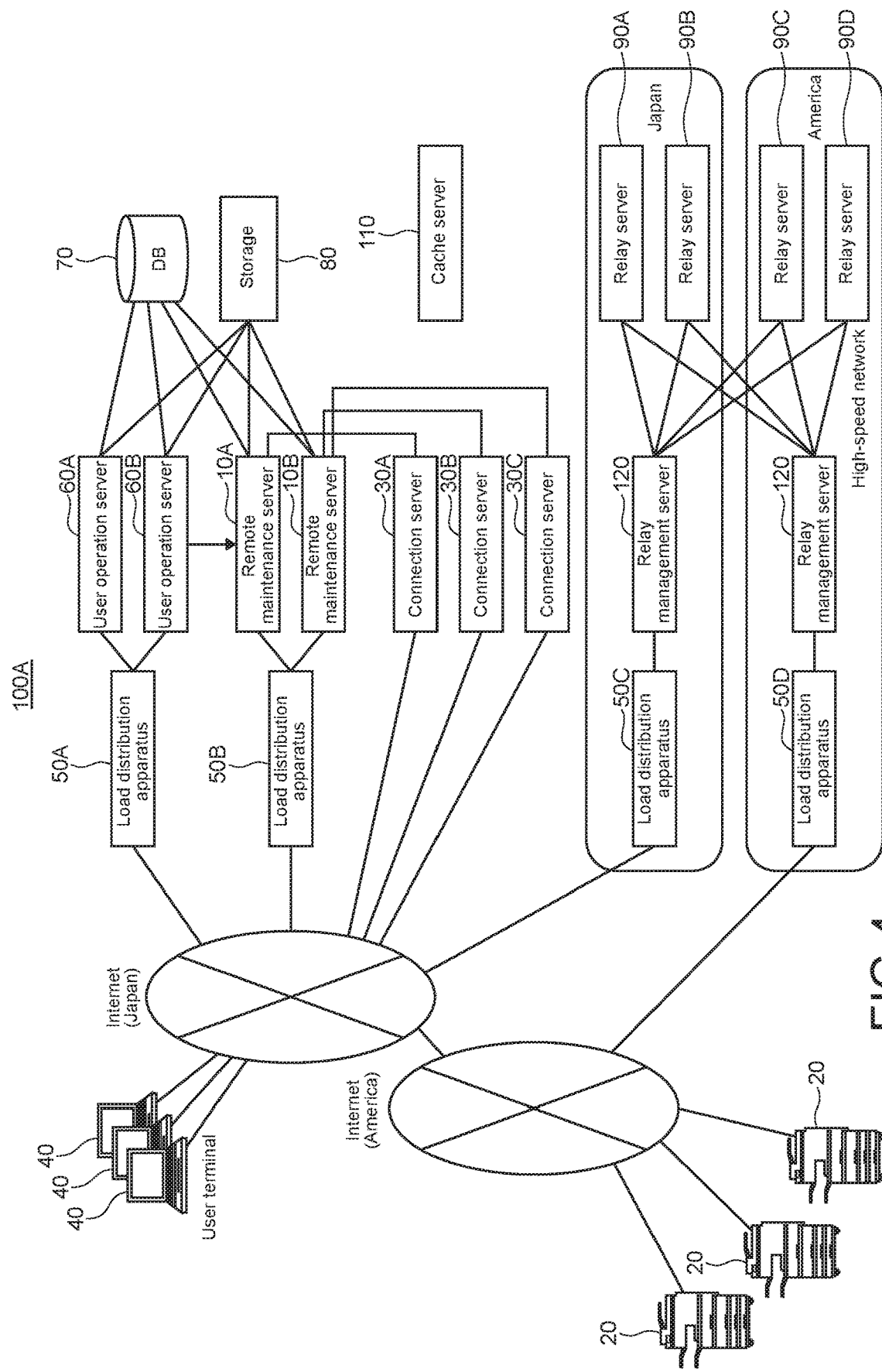
FIG. 4 shows an entire configuration of the remote management system 100A according to a modification example.

Next, a modification example will be described. FIG. 4 shows an entire configuration of the remote management system 100A according to a modification example. Note that the cache server 110 is connected to the remote maintenance servers 10 and the relay servers 90 (not shown).

The configuration of the remote management system 100A of FIG. 4 is different from the configuration of the aforementioned remote management system 100 mainly in the following two points.

According to the first different point, the relay servers 90 are provided in multiple sites (FIG. 4 shows Japan and America, for example). In each site, the load distribution apparatus 50 and the relay management server 120 are connected between the relay servers 90 and the Internet. The load distribution apparatus 50 is one end point from the Internet. According to this configuration, it is possible to reduce the burden of registration of a firewall in a site in which the image forming apparatuses 20 are provided.

According to the second different point, the relay management server 120 of one site is connected to the relay servers 90 of the other site via a high-speed network (high-speed network such as dedicated network). Communication via the Internet is executed only from the user terminal 40 or the image forming apparatus 20 to the nearest relay management server 120.

According to the aforementioned configuration, when executing the remote panel function, the user terminals 40 are distant from the relay servers 90, and the image forming apparatuses 20 are distant from the relay servers 90. The distant sites are connected via a high-speed network, which is faster than typical connection via the Internet. So it is possible to execute connection via the remote panel function faster and more stable.

The relay management server 120 analyzes a URI in an HTTP (Hypertext Transfer Protocol) request, which is presented when connecting from the image forming apparatus 20 or the user terminal 40, and thereby transfers the connection from one site to a different site.

As described above, the user terminal 40 is geographically distant from the image forming apparatus 20 such as Japan and America, for example. Even in such a case, video data of the remote panel function is sent and received via a high-speed communication network between those sites. So good communication performance is realized.

Figure 5:
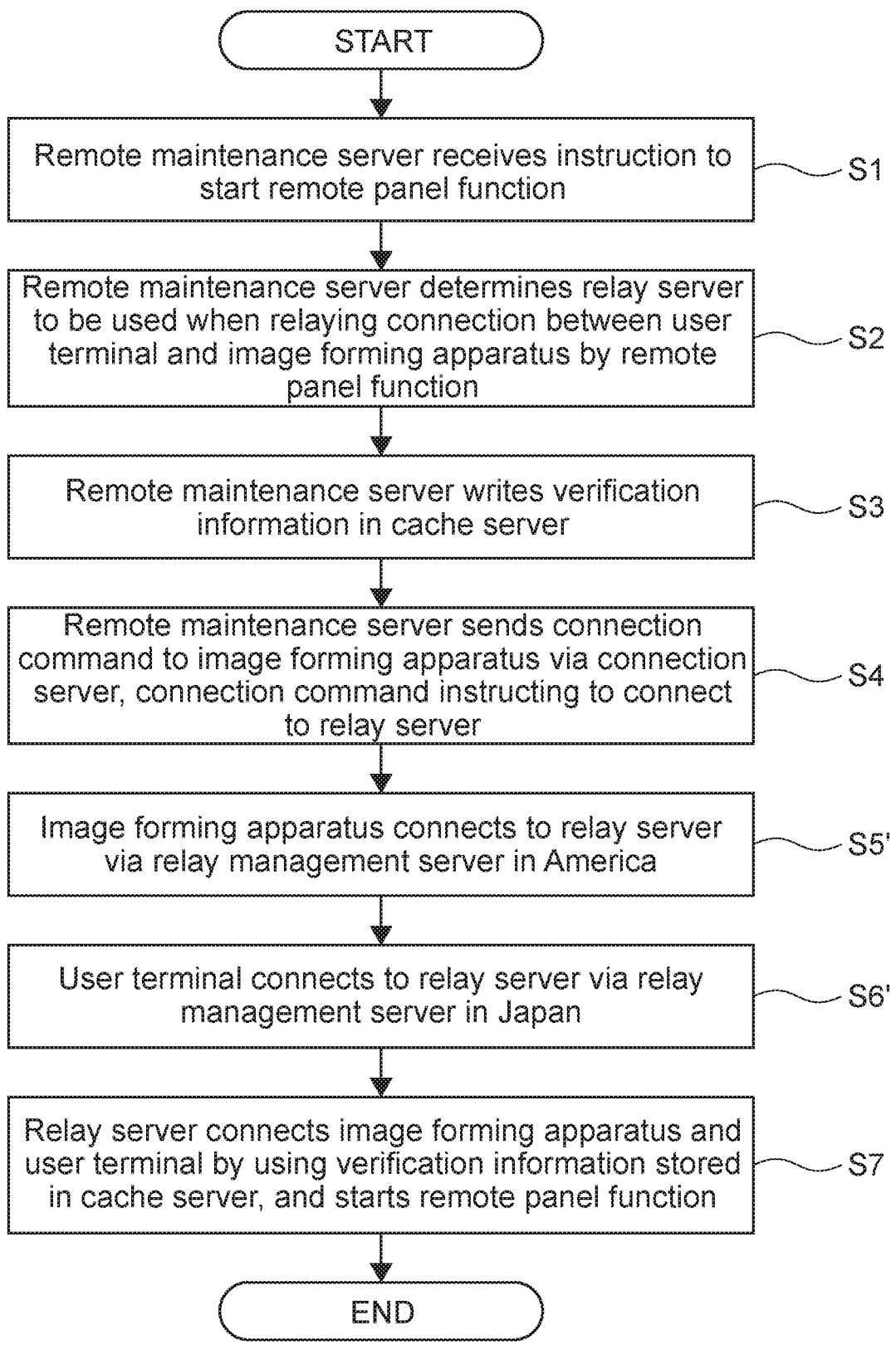
FIG. 5 shows a processing flow of starting the remote panel function by the remote management system 100A.

FIG. 5 shows a processing flow of starting the remote panel function by the remote management system 100A.

Firstly, the remote panel function start instruction receiving unit 11a of the remote maintenance server 10 receives an instruction to start a remote panel function from a user via the user terminal 40 and the user operation server 60 (Step S1).

Next, the relay server determining unit 11b of the remote maintenance server 10 determines the relay server 90 to be used when relaying connection between the user terminal 40 and the image forming apparatus 20 by the remote panel function (Step S2).

Next, the verification information writing unit 11c of the remote maintenance server 10 writes verification information in the cache server 110, the verification information being used when the relay server 90 relays connection between the user terminal 40 and the image forming apparatus 20 by the remote panel function (Step S3).

Next, the connection command sending unit 11d of the remote maintenance server 10 sends a connection command to the image forming apparatus 20 that executes the remote panel function via the connection server 30, the connection command instructing to connect to the relay server 90 determined (Step S4).

Next, the image forming apparatus 20 that executes the remote panel function connects to the specified relay server 90 via the relay management server 120 in America (Step S5').

Next, the user terminal 40 that executes the remote panel function connects to the specified relay server 90 via the relay management server 120 in Japan (Step S6').

Next, the relay server 90 connects the image forming apparatus 20 and the user terminal 40 on a basis of the verification information stored in the cache server 110, and starts the remote panel function (Step S7).

A modification example has been described above.

Second Embodiment

[Entire Configuration]

Figure 6:
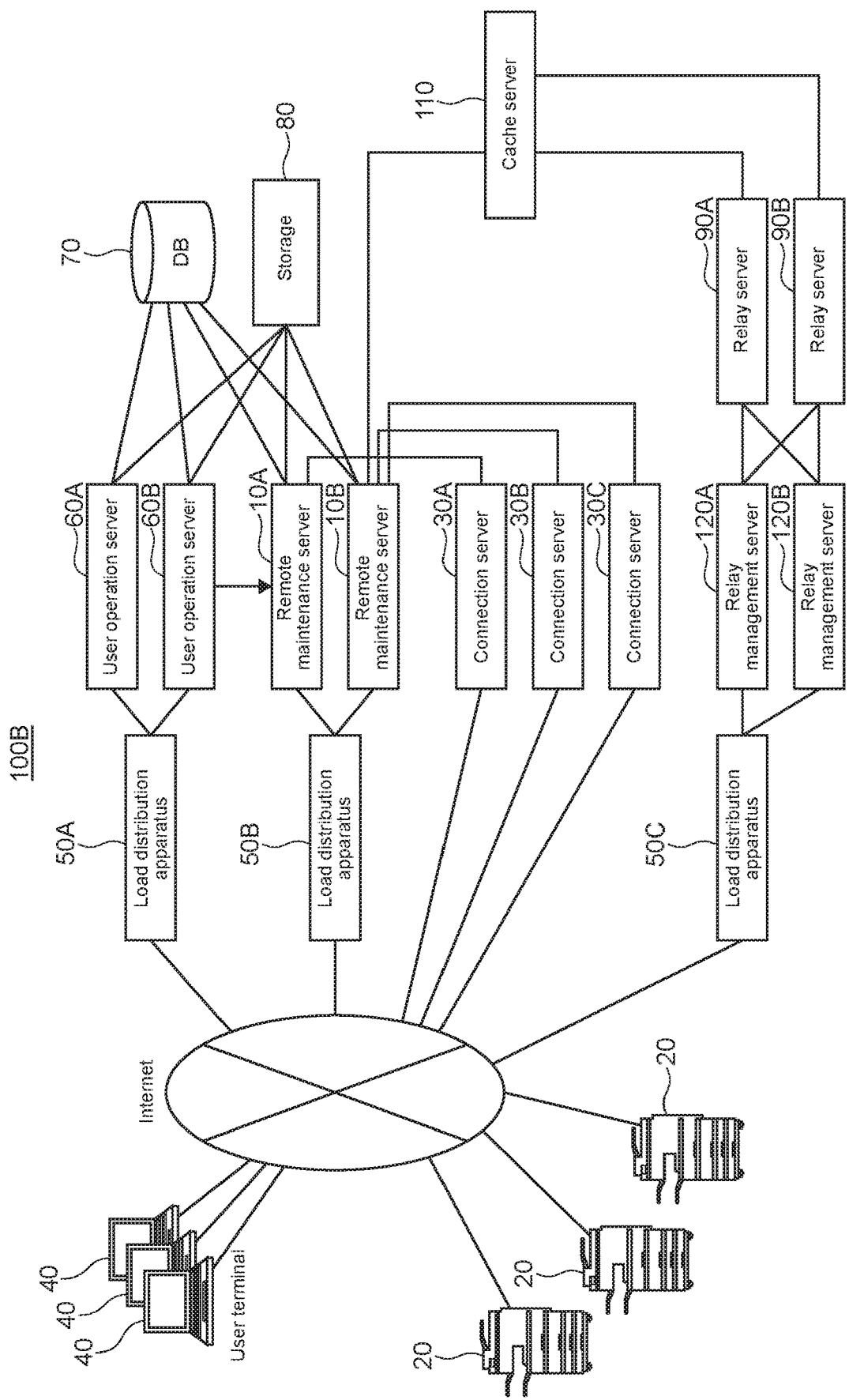
FIG. 6 shows an entire configuration of the remote management system 100B according to a second embodiment of the present disclosure.

Firstly, an entire configuration of the remote management system 100B according to a second embodiment of the present disclosure will be described. FIG. 6 shows an entire configuration of the remote management system 100B according to a second embodiment of the present disclosure.

The remote management system 100B includes the load distribution apparatuses 50 (hereinafter, the load distribution apparatuses 50A, 50B, and 50C are collectively referred to as the load distribution apparatus(es) 50), the user operation servers 60, the remote maintenance servers 10, the DB (database) 70, the storage 80, the connection servers 30, the relay servers 90, the cache server 110, the relay management server 120, the user terminal 40, and the image forming apparatuses 20, which are connected to each other via a network.

End points from the Internet includes the load distribution apparatus 50A, the load distribution apparatus 50B, the connection server 30 A, the connection server 30 B, the connection server 30 C, and the load distribution apparatus 50C. The load distribution apparatus 50A distributes accesses from the user terminals 40 to the user operation servers 60A and 60B. The load distribution apparatus 50B distributes accesses from the image forming apparatuses 20 to the remote maintenance servers 10A and 10B. The load distribution apparatus 50C distributes accesses from the user terminals 40 and the image forming apparatuses 20 to the relay management servers 120A and 120B.

The load distribution apparatus 50A distributes accesses from the user terminals 40 to the user operation servers 60A and 60B.

The user operation server 60 receives an instruction from a user input from the user terminal 40.

The load distribution apparatus 50B distributes accesses from the image forming apparatuses 20 to the remote maintenance servers 10A and 10B.

The remote maintenance server 120 remotely maintains the image forming apparatuses 20 that the remote maintenance server 120 manages. For example, the remote maintenance server 120 collects daily work information (toner consumption, number of print, etc.), stores the daily work information and the setting values of the image forming apparatuses 20 in the DB 70 and the storage 80, updates firmware of the image forming apparatuses 20.

The DB 70 stores the daily work information. The storage 80 stores the daily work information for a long time.

The connection server 30 is a server that executes management connection to the image forming apparatuses 20 in order to send management commands to the image forming apparatuses 20 managed in the remote management system 100B. The management connection is continued until the image forming apparatus 20 is powered off.

The image forming apparatus 20 connected to the network firstly connects to the remote maintenance server 10 via the load distribution apparatus 50B, and obtains a response. The response specifies the connection server 30 to which management connection is to be established. After that, the image forming apparatus 20 shuts down the connection to the remote maintenance server 10, connects to the specified the connection server 30, and establishes the management connection.

A user accesses the user operation server 60 via the user terminal 40, and instructs to change a setting value of a certain image forming apparatus 20. Then, the remote maintenance server 10 detects the instruction to change setting, and informs a person-in-charge that the setting value is to be changed. Then, the remote maintenance server 10 sends a setting value change command to the image forming apparatus 20 via the connection server 30, and causes the image forming apparatus 20 to change the setting value.

The relay server 90 is a server that relays communication of video data and the like between the user terminal 40 and the image forming apparatus 20 when executing a remote panel function.

The cache server 110 is a server that temporarily stores verification information used to connect the user terminal 40 and the image forming apparatus 20 by the relay server 90.

The relay management server 90 is a server that manages connection received from the user terminal 40 or the image forming apparatus 20. The relay management server 90 transfers connection received from the user terminal 40 or the image forming apparatus 20 to the relay server 90.

The load distribution apparatus 50C distributes accesses from the user terminals 40 and the image forming apparatuses 20 to the relay management servers 120A and 120B.

When a user instructs to start the remote panel function to the remote maintenance server 10 via the user terminal 40, the load distribution apparatus 50A, and the user operation server 60, the remote maintenance server 10 writes verification information in the cache server 110, and instructs the image forming apparatus 20 to connect to the relay server 90 and the relay management server 120 to be used via the connection server 30.

The user terminal 40 and the image forming apparatus 20 connect to the specified relay management server 120 and the relay server 90, and the relay server 90 relays connection on a basis of the verification information. As a result, the remote panel function is executed.

Before transferring connection from the user terminal 40 and the image forming apparatus 20, the relay management server 120 sends a "live confirmation" message to the relay server 90. If the relay server 90 sends, in reply, a "new request receivable" message, the relay management server 120 transfers the connection. If the relay server 90 sends, in reply, a "new request unreceivable" message, the relay management server 120 transfers the connection to another relay server 90, which is capable of receiving a new request.

The relay server 90 sends, in reply, a new request unreceivable message if the connection volume of the relay server 90 will exceed the connection volume that the relay server 90 can process, or if it is necessary to reboot the relay server 90 for system maintenance.

Note that, when each relay server 90 sends, in reply, the "new request unreceivable" message, each relay server 90 may additionally, automatically and newly deploy (activate) another relay server 90.

An entire configuration of the remote management system 100B has been described above. Note that, for example, FIG. 6 shows the three connection servers 30. This is merely an example. Actually, the number of the connection servers 30 is not limited.

[Configuration of Relay Management Server]

Figure 7:
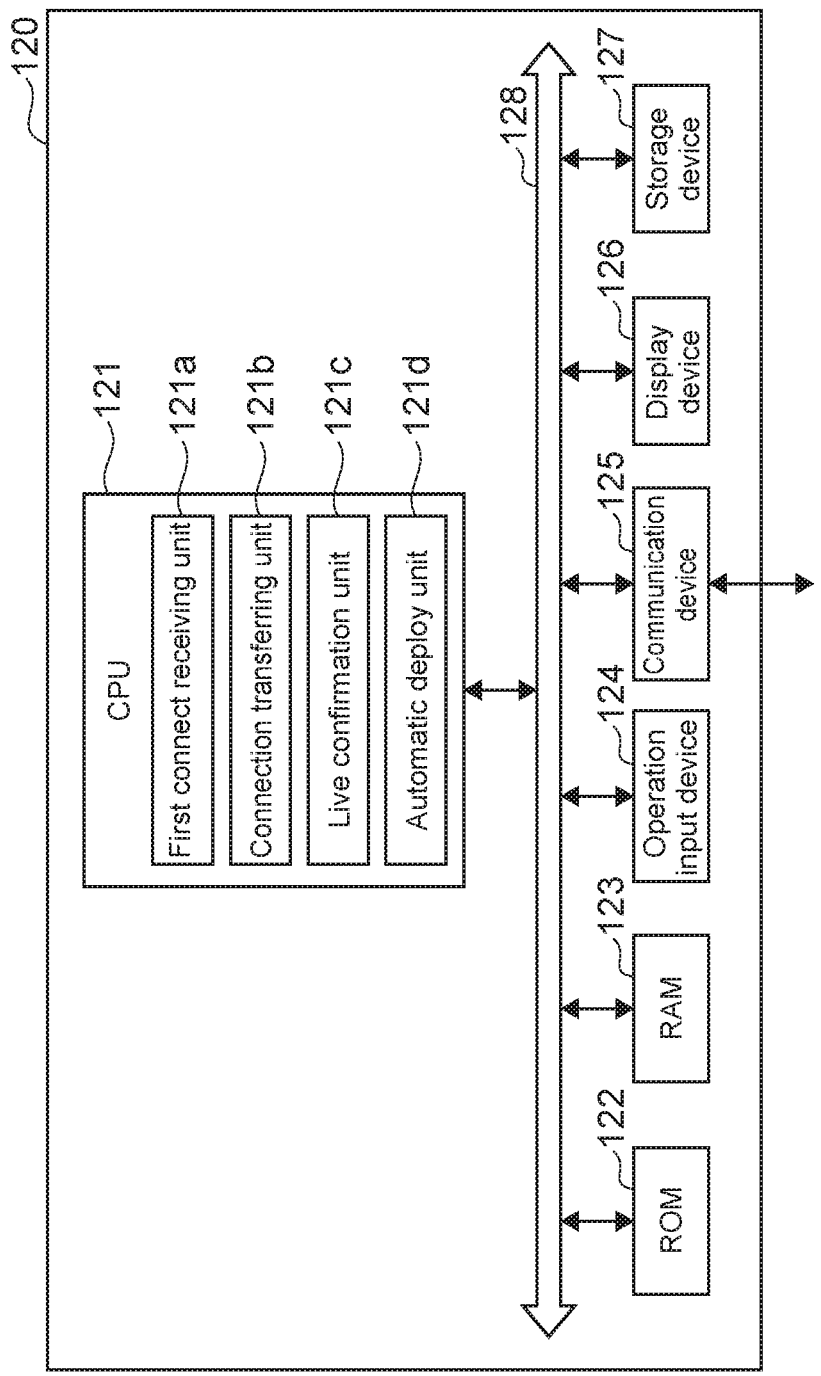
FIG. 7 shows a block configuration of the relay management server 120, where the relay management server 120 is a general-purpose computer.

Next, a configuration of the relay management server 120 will be described. The relay management server 120 may include dedicated hardware or software or a general-purpose computer. FIG. 7 shows a block configuration of the relay management server 120, where the relay management server 120 is a general-purpose computer.

As shown in FIG. 7, the relay management server 120 includes a CPU (Central Processing Unit) 121, a ROM (Read Only Memory) 122, a RAM (Random Access Memory) 123, an operation input device 124, a communication device 125, a display device 126, a storage device 127, and these blocks are connected to each other via a bus 128.

The ROM 122 stores a plurality of programs such as firmware for executing various types of process, and data. The RAM 123 is used as a work area of the CPU 121 and temporarily stores an OS (Operating System), various applications being executed, and various types of data being processed.

The storage device 127 is, for example, an HDD (Hard Disk Drive), a flash memory, or other nonvolatile memories. The storage device 127 stores the OS, various applications, and various types of data.

The communication device 125 is connected to a network for sending/receiving information to/from apparatuses.

Of the plurality of programs stored in the ROM 12 or the storage device 127, the CPU 121 loads a program in the RAM 123 in response to a command input via the operation input device 124, and appropriately controls the display device 126 and the storage device 127 according to the loaded program.

The operation input device 124 is, for example, a pointing device such as a mouse, a keyboard, a touch panel, or other operation devices.

The display device 126 is, for example, a liquid crystal display, an EL (Electro-Luminescence) display, or a plasma display.

Next, functional blocks will be described. When the CPU 121 of the management server 10 executes a program, the CPU 121 operates as the functional blocks described below.

The functional blocks that the CPU 121 of the relay management server 120 realizes are the first connect receiving unit 121*a*, the connection transferring unit 121*b*, the live confirmation unit 121*c*, and the automatic deploy unit 121*d*.

The first connect receiving unit 121a receives connection from the user terminal 40 and the image forming apparatus 20 to execute a remote panel function.

The connection transferring unit 121b transfers the connection received by the first connect receiving unit 121a to one of the relay servers 90 that return the "new request receivable" message or to a newly deployed relay server 90.

The live confirmation unit 121c sends a "live confirmation" message to the relay servers 90, and checks whether or not the relay servers 90 are capable of newly receiving transfer of connection.

The automatic deploy unit 121d additionally and newly deploying a relay server 90, if all the relay servers 90 return the "new request unreceivable" message in response to the "live confirmation" message from the live confirmation unit 121c.

A configuration of the relay management server 120 has been described above.

[Configuration of Relay Server]

Figure 8:
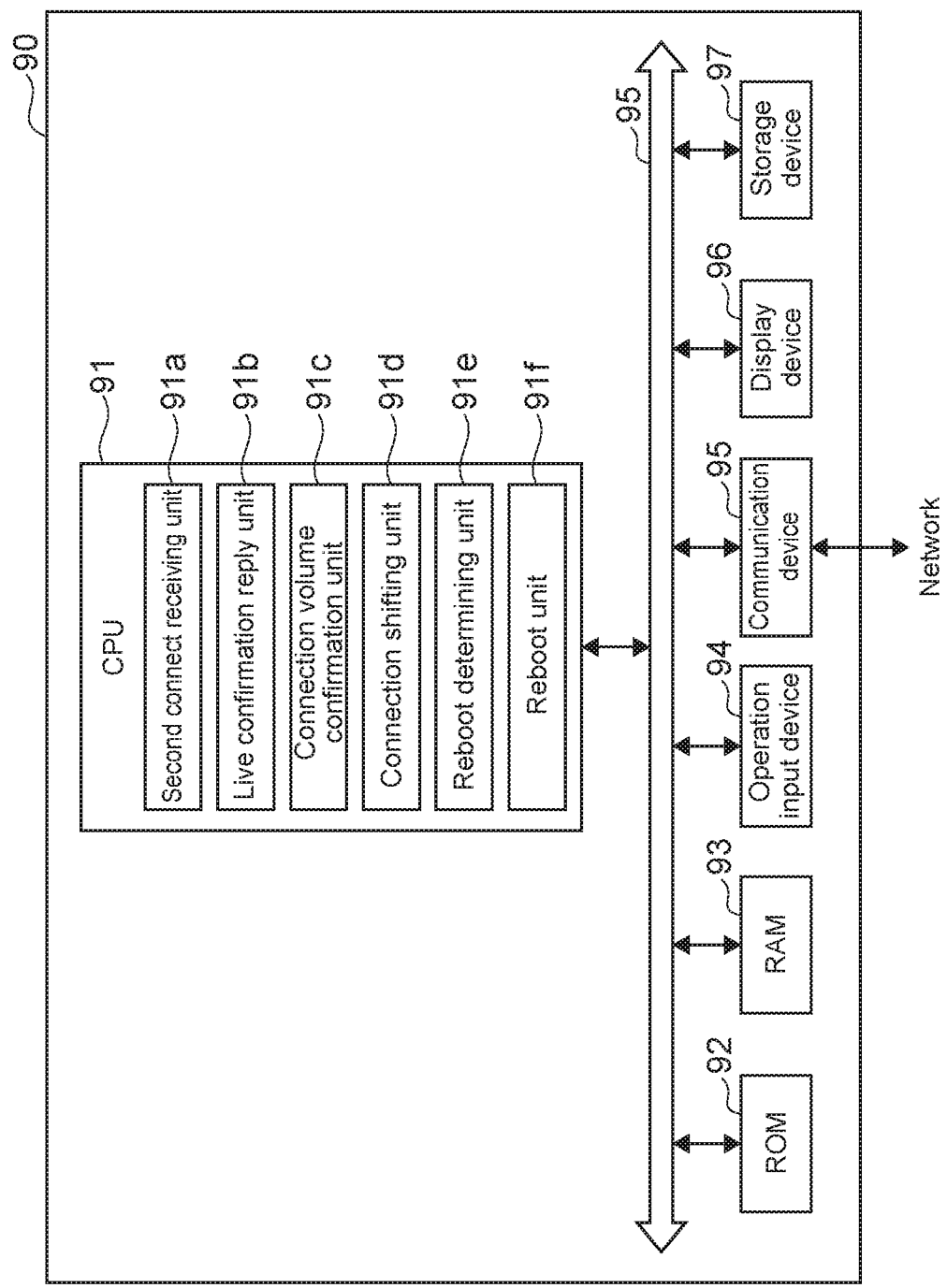
FIG. 8 shows a block configuration of the relay server 90, where the relay server 90 is a general-purpose computer.

Next, a configuration of the relay server 90 will be described. The relay server 90 may include dedicated hardware or software or a general-purpose computer. FIG. 8 shows a block configuration of the relay server 90, where the relay server 90 is a general-purpose computer.

As shown in FIG. 8, the relay server 90 includes a CPU 91, a ROM 92, a RAM 93, an operation input device 94, a communication device 95, a display device 96, a storage device 97, and these blocks are connected to each other via a bus 98.

The ROM 92 stores a plurality of programs such as firmware for executing various types of process, and data. The RAM 93 is used as a work area of the CPU 91 and temporarily stores an OS, various applications being executed, and various types of data being processed.

The storage device 97 is, for example, an HDD, a flash memory, or other nonvolatile memories. The storage device 97 stores the OS, various applications, and various types of data.

The communication device 95 is connected to a network for sending/receiving information to/from apparatuses.

Of the plurality of programs stored in the ROM 92 or the storage device 97, the CPU 91 loads a program in the RAM 93 in response to a command input via the operation input device 94, and appropriately controls the display device 96 and the storage device 97 according to the loaded program.

The operation input device 94 is, for example, a pointing device such as a mouse, a keyboard, a touch panel, or other operation devices.

The display device 96 is, for example, a liquid crystal display, an EL (Electro-Luminescence) display, or a plasma display.

Next, functional blocks will be described. When the CPU 91 executes a program, the CPU 91 operates as the functional blocks described below.

The functional blocks that the CPU 91 of the relay server 90 realizes are the second connect receiving unit 91a, the live confirmation reply unit 91b, the connection volume confirmation unit 91c, the connection shifting unit 91d, the reboot determining unit 91e, and the reboot unit 91f.

The second connect receiving unit 91a receives the connection from the user terminal 40 and the image forming apparatus 20, the connection being transferred from the relay management server 120.

The live confirmation reply unit 91b sends, in reply to the "live confirmation" message sent from the relay management server 120, a "new request receivable" message or a "new request unreceivable" message on a basis of a confirmation result of the connection volume confirmation unit 91c. The live confirmation reply unit 91b sends, in reply, the "new request unreceivable" message if the connection volume of the relay server 90 reaches the upper limit, or if the relay server 90 is to be rebooted for system maintenance.

The connection volume confirmation unit 91c confirms whether or not a connection volume of the relay server 90 reaches an upper limit.

The connection shifting unit 91d, if the relay server 90 is to be rebooted for system maintenance, shifts the currently managing connection to another relay server 90, in a unit so as not to affect performance of the relay management server 120.

The reboot determining unit 91e determines whether or not it is necessary to reboot the relay server 90 for the system maintenance and the like.

The reboot unit 91f reboots the relay server 90.

A configuration of the relay server 90 has been described above.

[Processing Flow (Main)]

Figure 9:
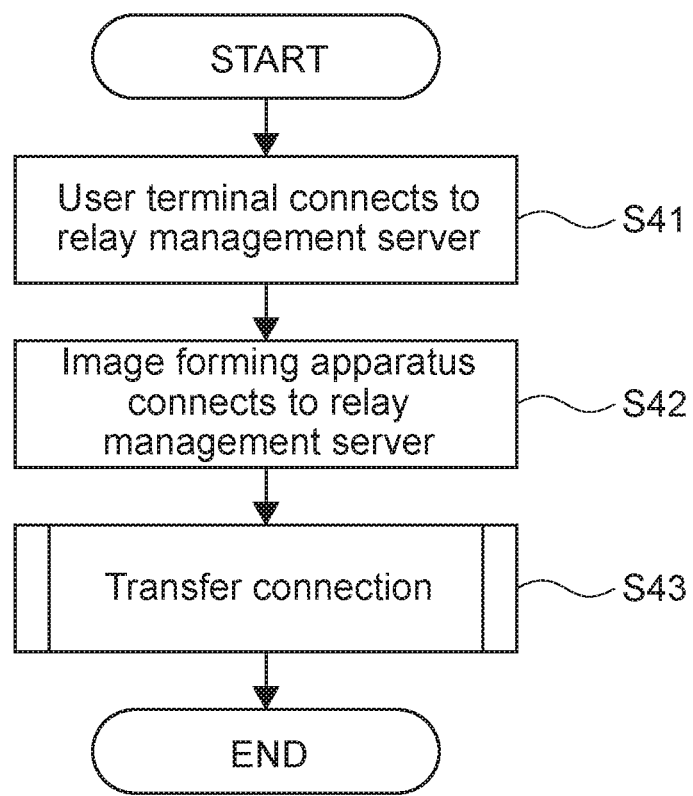
FIG. 9 shows a main processing flow of a processing flow of executing the remote panel function by the remote management system 100B.

Next, a main processing flow of a processing flow of executing the remote panel function by the remote management system 100B will be described. FIG. 9 shows a main processing flow of a processing flow of executing the remote panel function by the remote management system 100B.

Firstly, the user terminal 40 connects to the relay management server 120 to execute the remote panel function. The first connect receiving unit 121a receives the connection (Step S41).

Next, the image forming apparatus 20 connects to the same relay management server 120. The first connect receiving unit 121a receives the connection (Step S42).

Next, the relay management server 120 transfers the connection from the user terminal 40 and the image forming apparatus 20 to the relay server 90, and thereby starts the remote panel function (Step S43).

A main processing flow of a processing flow of executing the remote panel function by the remote management system 100B has been described above.

[Processing Flow (Transferring Connection)]

Figure 10:
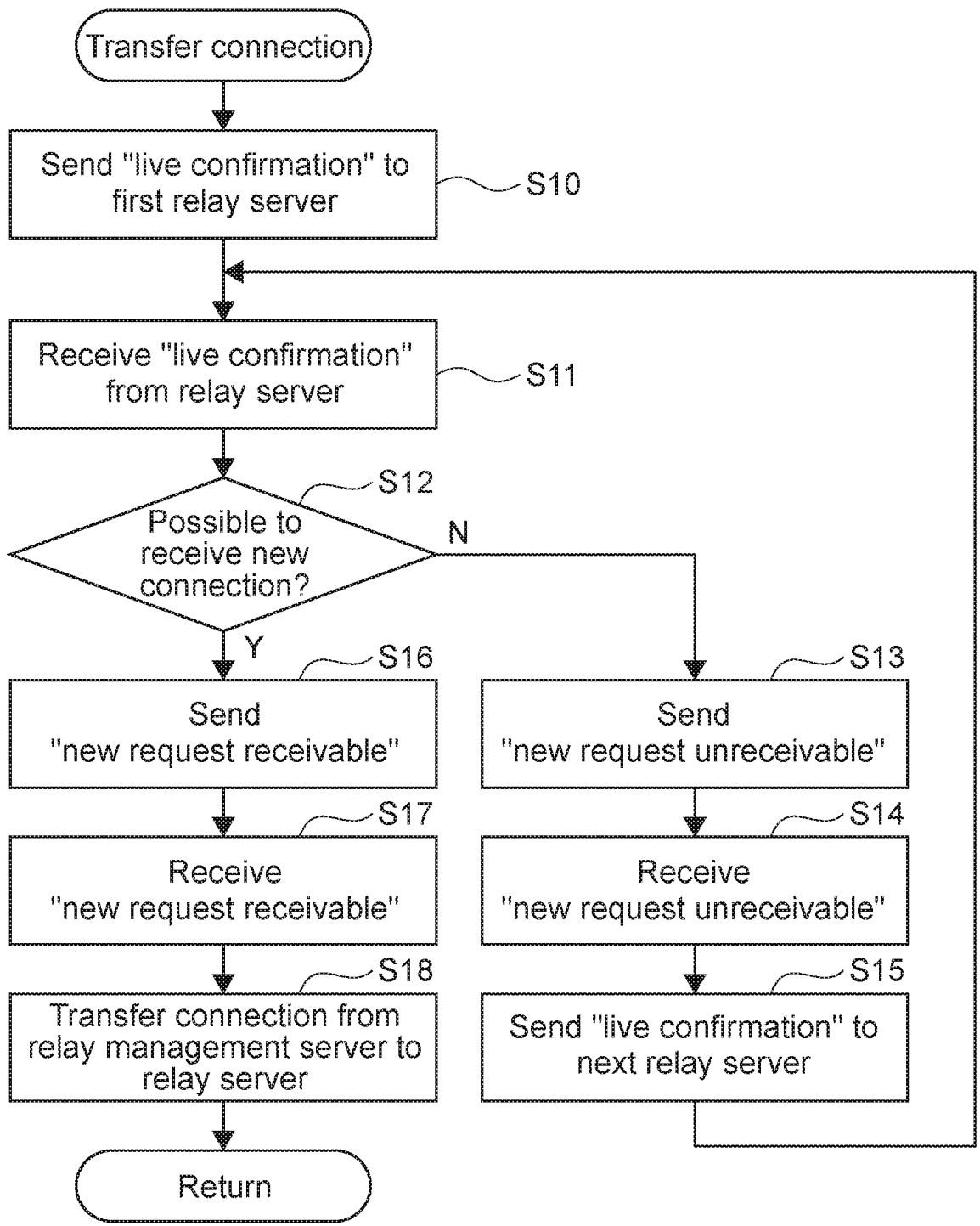
FIG. 10 shows a detailed processing flow of transferring connection in the processing flow of executing the remote panel function by the remote management system 100B.

Next, a detailed processing flow of transferring connection in the processing flow of executing the remote panel function by the remote management system 100B will be described. FIG. 10 shows a detailed processing flow of transferring connection in the processing flow of executing the remote panel function by the remote management system 100B.

Firstly, the live confirmation unit 121c of the relay management server 120 sends a "live confirmation" message to the first relay server 90 (Step S10).

Next, the live confirmation reply unit 91b of the relay server 90 receives the "live confirmation" message (Step S11).

Next, the live confirmation reply unit 91b inquires the connection volume confirmation unit 91c whether or not it is possible to receive new connection, and determines that (Step S12).

If it is not possible to receive new connection (Step S12, N), the live confirmation reply unit 91b sends, in reply, a "new request unreceivable" message to the relay management server 120 (Step S13).

Next, the live confirmation unit 121c of the relay management server 120 receives the "new request unreceivable" message (Step S14).

Next, the live confirmation unit 121c puts a "new request unreceivable" flag on the relay server 90, which has returned the "new request unreceivable". After that, the live confirmation unit 121c sends a "live confirmation" message to a next relay server 90 (Step S15). After that, the process returns to Step S11 and the process will continue.

In Step S12, if it is possible to receive new connection (Step S12, Y), the live confirmation reply unit 91b of the relay server 90 sends a "new request receivable" message to the relay management server 120 (Step S16).

Next, the live confirmation unit 121c of the relay management server 120 receives the "new request receivable" message (Step S17).

Next, the connection transferring unit 121b of the relay management server 120 transfers the connection to the relay server 90, which has sent the "new request receivable" message in reply. The second connect receiving unit 91a of the relay server 90 receives the transferred connection, and starts the remote panel function (Step S18).

A detailed processing flow of transferring connection in the processing flow of executing the remote panel function by the remote management system 100B has been described above.

[Processing Flow (Rebooting Relay Server)]

Figure 11:
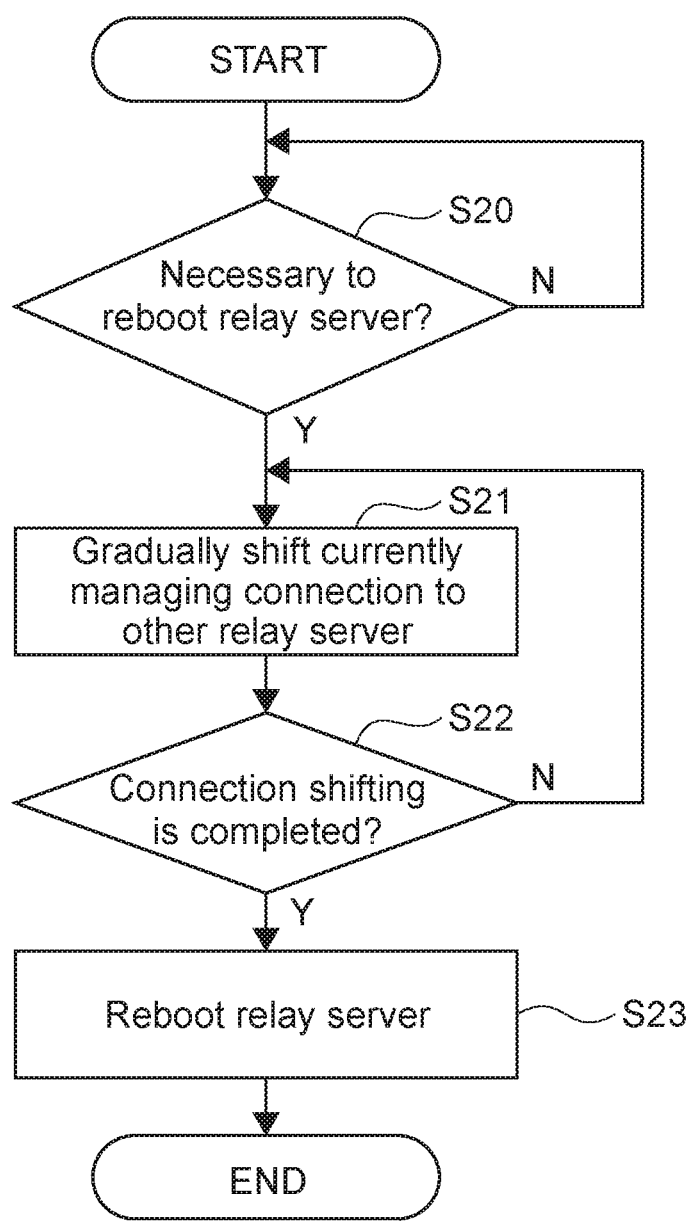
FIG. 11 shows a processing flow of rebooting the relay server 90 of the remote management system 100B.

Next, a processing flow of rebooting the relay server 90 of the remote management system 100B will be described. FIG. 11 shows a processing flow of rebooting the relay server 90 of the remote management system 100B.

Firstly, the reboot determining unit 91e of the relay server 90, which will execute system maintenance, determines whether or not it is necessary to reboot the relay server 90 (Step S20).

If it is not necessary to reboot the relay server 90 (Step S20, N), the relay server 90 returns to Step S20 and stands by.

If it is necessary to reboot the relay server 90 (Step S20, Y), the connection shifting unit 91d of the relay server 90 gradually shifts the currently managing connection to another relay server 90, in a unit so as not to affect performance of the relay management server 120 (Step S21). The relay server 90 to be rebooted may finish connection once, transfer the connection to a new relay server 90 at a time when the relay server 90 to be rebooted receives re-connection requests from the user terminal 40 and the image forming apparatus 20, and shift the connection.

Next, the connection shifting unit 91d determines whether or not the connection shifting unit 91d has shifted all the connections (Step S22).

If there is connection yet to be shifted (Step S22, N), the connection shifting unit 91d returns to Step S21, and continues the process.

If the connection shifting unit 91d has shifted all the connections (Step S22, Y), next, the reboot unit 91f of the relay server 90 reboots the relay server 90 (Step S23).

A processing flow of rebooting the relay server 90 of the remote management system 100B has been described above.

[Processing Flow (Adding Relay Server)]

Figure 12:
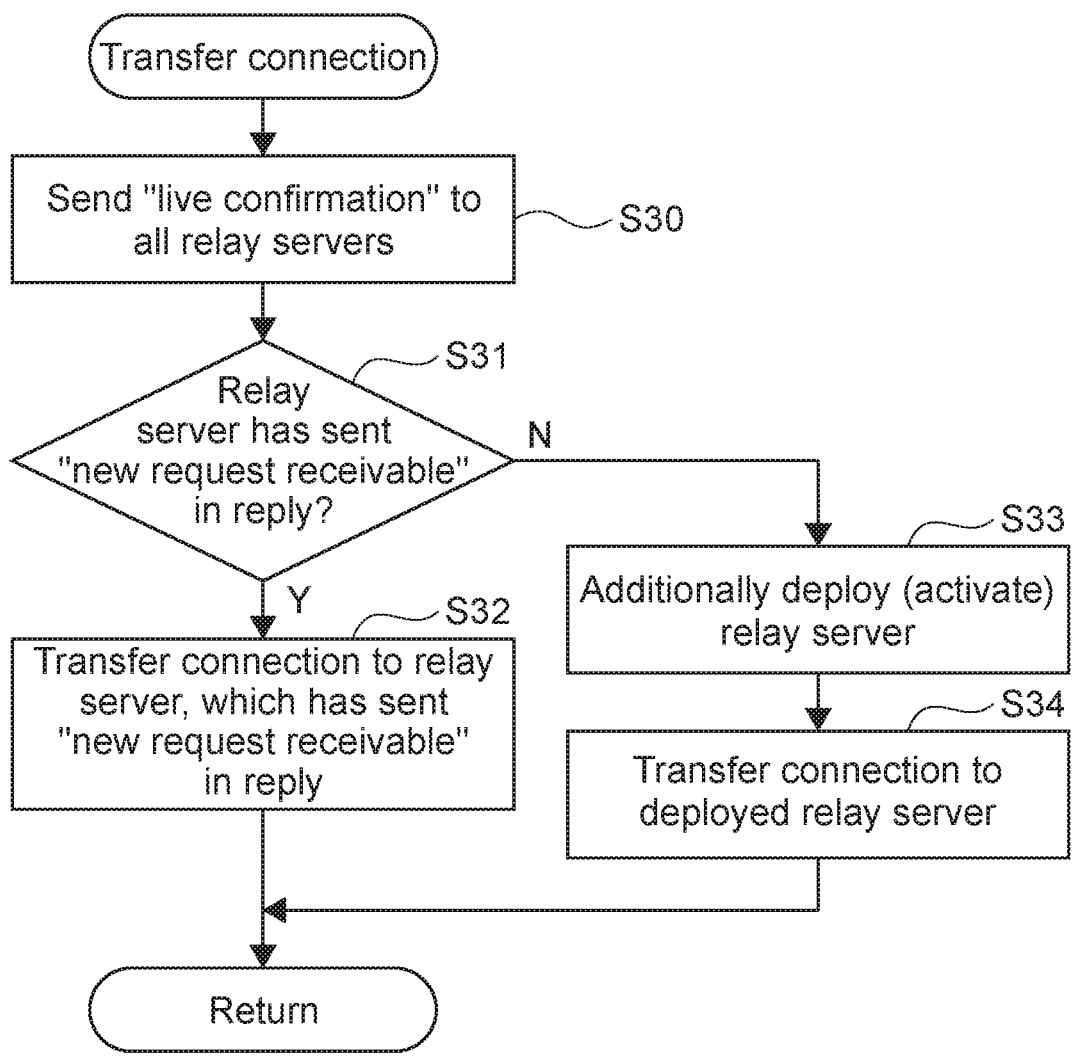
FIG. 12 shows a processing flow of adding (automatically deploying) the relay server 90 of the remote management system 100B.

Next, a processing flow of adding (automatically deploying) the relay server 90 of the remote management system 100B will be described. FIG. 12 shows a processing flow of adding (automatically deploying) the relay server 90 of the remote management system 100B.

Firstly, the live confirmation unit 121c sends a "live confirmation" message to all the relay servers 90 (Step S30).

Next, the live confirmation unit 121c determines whether or not there is a relay server 90, which has sent, in reply, a "new request receivable" message, on a basis of replies sent from the relay servers 90 (Step S31).

If there is a relay server 90, which has sent, in reply, a "new request receivable" message (Step S31, Y), the connection transferring unit 121b transfers connection to the relay server 90, which has sent, in reply, the "new request receivable" message. The connection transferring unit 121b starts the remote panel function (Step S32).

If there is no relay server 90, which has sent, in reply, a "new request receivable" message (Step S31, N), the automatic deploy unit 121d additionally and automatically deploys (activates) a relay server 90 (Step S33).

Next, the connection transferring unit 121b transfers connection to the deployed relay server 90, and starts the remote panel function (Step S34).

A processing flow of adding (automatically deploying) the relay server 90 of the remote management system 100B has been described above.

It should be understood by those skilled in the art that various modifications, combinations, sub-combinations and alterations may occur depending on design requirements and other factors insofar as they are within the scope of the appended claims or the equivalents thereof.

What is claimed is:

1. A remote management system, comprising:
   a user operation server;
   a remote maintenance server;
   a connection server;
   a relay server;
   a cache server;
   a user terminal; and
   an image forming apparatus,
   the user operation server, the remote maintenance server, the connection server, the relay server, and the cache server being connected to each other via a network,
   the user terminal being connected to the user operation server, the remote maintenance server, the connection server, the relay server, and the cache server via Internet,
   the image forming apparatus being connected to the user operation server, the remote maintenance server, the connection server, the relay server, and the cache server via the Internet,
   the remote maintenance server including a processor that operates as
      a remote panel function start instruction receiving unit that receives an instruction to start a remote panel function from a user via the user terminal and the user operation server,
      a relay server determining unit that determines the relay server to be used when executing the remote panel function,
      a verification information writing unit that writes verification information in the cache server, the verification information being used when the relay server relays connection, and
      a connection command sending unit that sends a connection command to the image forming apparatus that executes the remote panel function via the connection server, the connection command instructing to connect to the relay server to be used,
   the relay server including a processor that
      relays connection from the user terminal that executes the remote panel function and connection from the image forming apparatus that executes the remote panel function on a basis of verification information stored in the cache server.

2. The remote management system according to claim 1, further comprising:
   a load distribution apparatus being one end point; and
   a relay management server that manages the relay server, the load distribution apparatus and the relay management server being connected between the Internet and the relay server, the load distribution apparatus being connected between the Internet and the relay management server, the relay management server being connected between the load distribution apparatus and the relay server.

3. The remote management system according to claim 2, wherein the load distribution apparatus, the relay management server, and the relay server are provided for every site out of multiple sites, and the relay management server and the relay server in one site out of the multiple sites are connected to the relay management server and the relay server in another site out of the multiple sites via a network faster than Internet.

4. An information processing method for an remote management system including a user operation server,
a remote maintenance server,
a connection server,
a relay server,
a cache server,
a user terminal, and
an image forming apparatus, the user operation server, the remote maintenance server, the connection server, the relay server, and the cache server being connected to each other via a network, the user terminal being connected to the user operation server, the remote maintenance server, the connection server, the relay server, and the cache server via Internet, the image forming apparatus being connected to the user operation server, the remote maintenance server, the connection server, the relay server, and the cache server via the Internet, the information processing method comprising:

by a remote panel function start instruction receiving unit of the remote maintenance server, receiving an instruction to start a remote panel function from a user via the user terminal and the user operation server;

by a relay server determining unit of the remote maintenance server, determining the relay server to be used when executing the remote panel function to connect the user terminal and the image forming apparatus;

by a verification information writing unit of the remote maintenance server, writing verification information in the cache server, the verification information being used when the relay server relays connection between the user terminal and the image forming apparatus by using the remote panel function;

by a connection command sending unit of the remote maintenance server, sending a connection command to the image forming apparatus that executes the remote panel function via the connection server, the connection command instructing to connect to the relay server determined;

by the image forming apparatus that executes the remote panel function, connecting to the relay server determined;

by the user terminal that executes the remote panel function, connecting to the relay server determined; and by the relay server, connecting the image forming apparatus and the user terminal that executes the remote panel function by using the verification information in the cache server, and starting the remote panel function.

5. An information processing method for an remote management system including a relay management server,
relay servers,
a user terminal, and
an image forming apparatus, the relay management server, the relay servers, the user terminal, and the image forming apparatus being connected to each other via a network, the information processing method comprising:

by a first connect receiving unit of the relay management server, receiving connection from the user terminal and the image forming apparatus to execute a remote panel function;

by a live confirmation unit of the relay management server, sending a "live confirmation" message to the relay servers, and checking whether or not the relay servers are capable of newly receiving transfer of connection;

by a connection volume confirmation unit of each of the relay servers, confirming whether or not a connection volume of the relay server reaches an upper limit, by a live confirmation reply unit of each of the relay servers, sending, in reply to the "live confirmation" message sent from the relay management server, a "new request receivable" message or a "new request unreceivable" message on a basis of a confirmation result of the connection volume confirmation unit;

by the connection transferring unit of the relay management server, transferring the connection received by the first connect receiving unit to one relay server that returns the "new request receivable" message; and by a second connect receiving unit of each of the relay servers, receiving the connection from the user terminal and the image forming apparatus, the connection being transferred from the relay management server.

6. The information processing method according to claim 5, further comprising:

by a connection shifting unit of each of the relay servers, if the relay server is to be rebooted for system maintenance, shifting the currently managing connection to another relay server, in a unit so as not to affect performance of the relay management server;

by a reboot determining unit of each of the relay servers, determining whether or not it is necessary to reboot the relay server for the system maintenance; and by a reboot unit of each of the relay servers, rebooting the relay server.

7. The information processing method according to claim 5, further comprising:

by an automatic deploy unit of the relay management server, additionally and newly deploying a relay server, if all the relay servers return the "new request unreceivable" message in response to the "live confirmation" message from the live confirmation unit; and by the connection transferring unit of the relay management server, transferring the connection received by the first connect receiving unit to one of the relay servers that return the "new request receivable" message or to a newly deployed relay server.

* * * * *